(12) United States Patent
Crumb et al.

(10) Patent No.: US 9,740,778 B2
(45) Date of Patent: Aug. 22, 2017

(54) RANKING DOMAINS USING DOMAIN MATURITY

(75) Inventors: Janine Crumb, Seattle, WA (US);
Krishna C. Gade, Redmond, WA (US);
Rangan Majumder, Redmond, WA (US);
Vishnu Challam, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2329 days.

(21) Appl. No.: 11/548,152

(22) Filed: Oct. 10, 2006

(65) Prior Publication Data
US 2008/0086467 A1 Apr. 10, 2008

(51) Int. Cl.
*G06F 17/30* (2006.01)
(52) U.S. Cl.
CPC .............. *G06F 17/30864* (2013.01)
(58) Field of Classification Search
CPC ......... G06F 17/30864; G06F 17/30887; G06F 17/30728; G06F 17/2217; G06Q 30/02
See application file for complete search history.

(56) References Cited

U.S. PATENT DOCUMENTS

| | | | | |
|---|---|---|---|---|
| 5,696,962 A | * | 12/1997 | Kupiec | 707/4 |
| 6,567,103 B1 | * | 5/2003 | Chaudhry | G06F 17/30873 |
| | | | | 707/999.003 |
| 6,636,848 B1 | * | 10/2003 | Aridor et al. | 707/3 |
| 2004/0002973 A1 | * | 1/2004 | Chaudhuri et al. | 707/7 |
| 2004/0064335 A1 | * | 4/2004 | Yang | G06Q 30/06 |
| | | | | 726/25 |
| 2004/0128273 A1 | * | 7/2004 | Amitay | G06F 17/30893 |
| 2005/0071741 A1 | * | 3/2005 | Acharya et al. | 715/500 |
| 2005/0235343 A1 | * | 10/2005 | Stephens | 726/6 |
| 2006/0212441 A1 | * | 9/2006 | Tang et al. | 707/5 |
| 2006/0294124 A1 | * | 12/2006 | Cho | 707/101 |
| 2007/0100824 A1 | * | 5/2007 | Richardson et al. | 707/7 |
| 2007/0219963 A1 | * | 9/2007 | Soroca | 707/3 |
| 2007/0244884 A1 | * | 10/2007 | Yang | 707/5 |
| 2008/0071797 A1 | * | 3/2008 | Thornton | 707/10 |

OTHER PUBLICATIONS

Alani et al. "Metrics for Ranking Ontologies" Copyright is held by the author/owner(s).WWW2006, May 22-26, 2006, Edinburgh, UK.*
Ding et al. "Finding and Ranking Knowledge on the Semantic Web" Y. Gil et al. (Eds.): ISWC 2005, LNCS 3729, pp. 156-170, 2005., Springer-Verlag Berlin Heidelberg 2005.*
Nie et al. "Object-Level Ranking: Bringing Order to Web Objects" WWW 2005, May 1014,, 2005, Chiba, Japan., ACM 1595930469/05/0005.*

(Continued)

*Primary Examiner* — Jason Liao
*Assistant Examiner* — Berhanu Mitiku
(74) *Attorney, Agent, or Firm* — Shook, Hardy & Bacon L.L.P.

(57) ABSTRACT

Ranking domains for search engines is provided herein. To rank a domain, contributing domains associated with the domain are identified. Additionally, the maturity of each of the contributing domains is determined. A rank for the domain is then determined based at least in part on the maturity of each of the contributing domains. The domain rankings may then be used to order results for search queries.

20 Claims, 5 Drawing Sheets

(56) References Cited

OTHER PUBLICATIONS

Brin et al. "The Anatomy of a Large-Scale Hypertextual Web Search Engine", Computer Science Department, Stanford University, Stanford, CA 94305, USA.*
Cho et al. "Impact of Search Engines on Page Popularity" WWW2004, May 17-22, 2004, New York, New York, USA. ACM.*
Tomlin "A New Paradigm for Ranking Pages on the World Wide Web" IBM Almaden Research Center, 650 Harry Road K53/802, San Jose, CA 95120, 2003.*
Brin et al. "The Anatomy of a Large-Scale Hyper textual Web Search Engine" Computer Science Department, Stanford University, Stanford, CA 94305, USA 1998.*
Cho et al. "Impact of Search Engines on Page Popularity" WWW2004, May 17-22, 2004, New York, New York, USA. ACM
Tomlin "A New Paradigm for Ranking Pages on the World Wide Web" IBM Almaden Research Center, 650 Harry Road K53/802, San Jose, CA 95120, 2003.*
Trevor et al. "A Modern Approach to Searching the World Wide Web: Ranking Pages by Inference over Content", Beloit College, Beloit, WI 53511, USA Aug. 8, 2001.*
Roy et al. "Impact of Search Engine on Page Popularity" UCLA Computer Science Department, Los Angeles, CA 90095 ACM WWW 2004, May 17-22, 2004, New York, NY USA.*
Dhyani et al. "Deriving and verifying statistical distribution of a hyperlink-based Web page quality metric" School of Computer Engineering, Nanyang Technological University, Singapore 639798, Singapore Received Jun. 19, 2002; received in revised form Nov. 20, 2002; accepted Jan. 22, 2003.*

\* cited by examiner

RANKING DOMAINS USING DOMAIN MATURITY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

Domain ranking is frequently used by search engines to facilitate the ordering of results for a search query. In general, a domain may be ranked based in part on the number of contributing domains associated with that domain. A contributing domain may be, for instance, one that includes a link to the domain being ranked. For example, if hundreds of other domains that maintain at least one web site include one or more links to a particular domain, the domain may receive a higher rank than another domain that is referenced by just a few other domains. In addition to the number of contributing domains, ranks of the contributing domains may influence the rank for the domain as well. For example, if a trusted, popular domain, such as Yahoo.com or CNN.com, includes a link to the domain, the ranks for such popular domains may be attributed to the rank for the domain. Receiving a higher domain ranking often means that the domain would be listed above other competing domains, thereby affording more visits by those browsing or searching the Internet. For domains that maintain commercial web sites or web sites that charge advertisers on per-click or per-visit basis, a higher domain ranking means better profitability. For example, sites like Yahoo.com and CNN.com, which are visited by millions of people each day, attract many commercial advertisers who are willing to pay large fees.

Typically, a domain includes links to other domains to make its content more useful and attractive for its visitors. Most existing domain ranking algorithms often assume that a number of contributing domains that maintain one or more links to a particular domain provides an indication of the popularity or utility of the particular domain. Those algorithms also tend to assume that the particular domain is popular and/or useful if a link is included in another domain that is well-known for its popularity and utility, such as MSN.com. These assumptions have been held to be mostly correct when it was neither easy nor cheap to register and maintain a domain.

Due in part to increased competition in the domain registration market in recent years, however, the cost involved in purchasing a domain has decreased significantly. In some cases, domain registrars even offer free domain registrations for up to thirty to sixty day trial periods. Spammers often take advantage of such offers through a spam technique known as a web farm. In particular, spammers purchase or otherwise obtain a large number of sites and interlink the sites together to increase the sites' rankings by artificially increasing the number of contributing domains for some or all of the sites. In effect, this practice defeats the assumption that the more a domain is referenced by other domains, the more likely that the domains is popular and/or useful such that it should be highly ranked.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to, among other things, ranking a domain. One or more contributing domains associated with a target domain are identified and the maturity of the contributing domains is determined. By way of example only and not limitation, the maturity of a contributing domain may be determined based on the date that it was registered or the date that it was first discovered by a search engine. A rank for the target domain is then calculated based on the maturity of the contributing domains associated with that target domain. Accordingly, when a search engine receives a search query, results may be ordered based at least in part on the domain rankings.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Overview

Embodiments of the present invention provide an approach for ranking a domain based on the maturity of contributing domains associated with the domain. By way of example only and not limitation, a maturity of a contributing domain may be based on the date that the contributing domain was registered or the date that the contributing domain was first discovered by a search engine.

Less mature (i.e., newer) domains typically have a higher likelihood of being spam and/or being a part of a web farm that attempts to artificially inflate domain rankings for domains in the web farm. Accordingly, by taking into account the maturity of contributing domains when determining a rank for a domain, embodiments of the present invention provide domain rankings in which more relevant and useful domains may be ranked higher than spam domains and/or less relevant domains.

Accordingly, in one aspect, an embodiment of the present invention is directed to a method for ranking a domain. The method includes receiving a list of one or more contributing domains associated with the domain. The method also includes determining a maturity for at least one of the contributing domains. The method further includes calculating a rank for the domain based at least in part on the maturity for the contributing domain.

In another aspect of the invention, an embodiment is directed to a method for presenting search results. The method includes receiving information associated with a number of domains. The method also includes determining a maturity for each of one or more contributing domains associated with each domain. The method further includes calculating a rank for each of the domains based at least in part on the maturity for the contributing domains associated with the each domain. The method also includes generating one or more search results that include domains that match a search query. The method still further includes presenting the search results in accordance with ranks of the domains that match the search query.

In a further aspect, an embodiment of the present invention is directed to a search engine for ranking search results. The search engine includes a ranking component configured to determine one or more contributing domains associated with each of a number of domains. The ranking component is also configured to determine a maturity for each of the contributing domains and to calculate a rank for each of the domains based at least in part on the maturity for at least one of the contributing domains. The search engine also includes a searching component configured to perform a search in response to a search query and to return one or more search results comprising at least one of the domains that match the search query.

Exemplary Operating Environment

Figure 1:
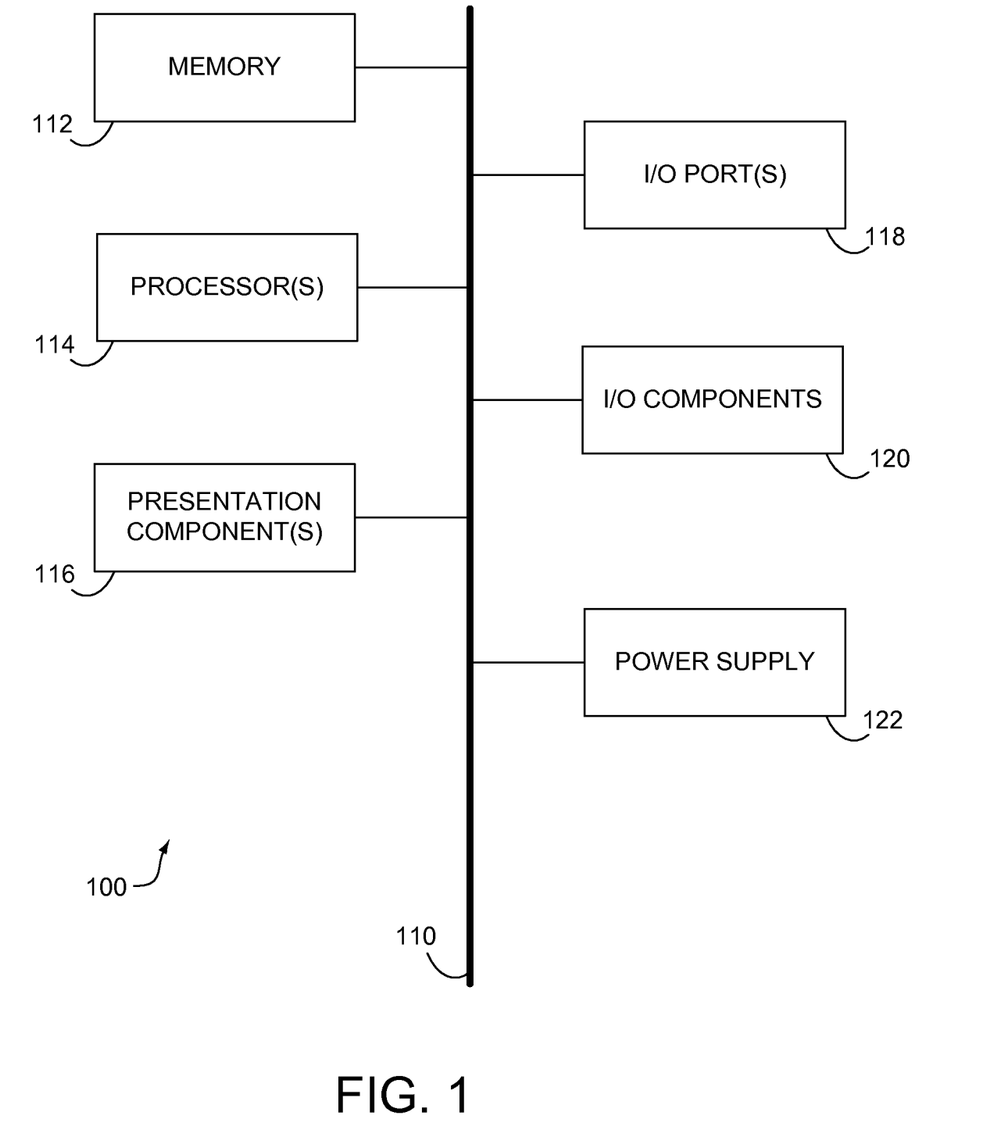
FIG. 1 is a block diagram of an exemplary computing environment suitable for use in implementing the present invention.

Referring to the drawings in general and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprises Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode and store desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O port(s) 118 allow computing device 100 to be logically coupled to other devices including I/O components 120, some of which may be built in. Illustrative components include a microphone, joystick, game pad, satellite dish, scanner, printer, wireless device, etc.

Exemplary System

Figure 2:
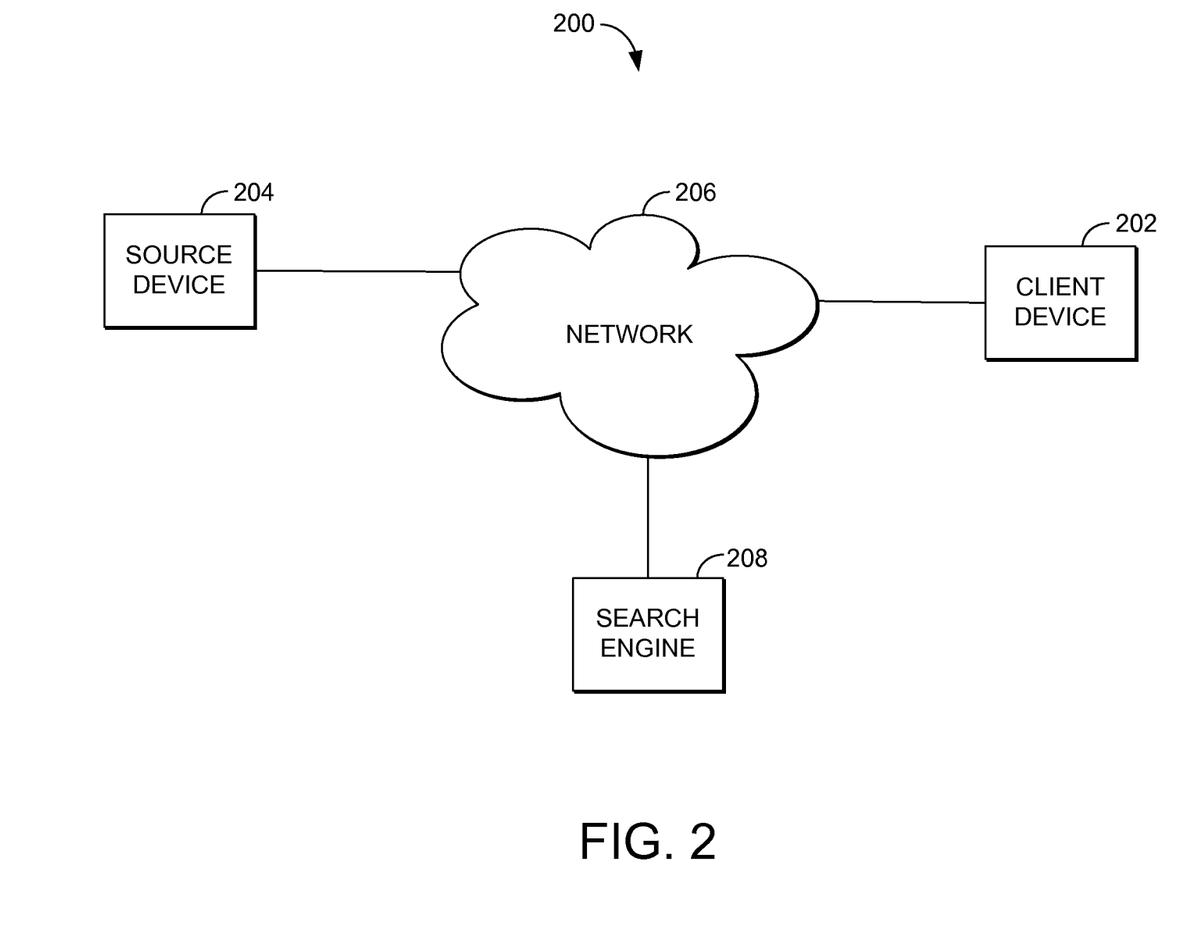
FIG. 2 is a block diagram of an exemplary system in which embodiments of the present invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include multiple client devices, such as client device 202, multiple source devices, such as source device 204, and a search engine 208. Each of the client devices, source devices, and search engine may be any type of computing device, such as computing device 100 described with reference to FIG. 1, for example. The components may communicate with each other via a network 206, which may include, without limitation, one or more local area networks (LANs) and/or wide area networks (WANs). Such networking environments are commonplace in offices, enterprise-wide computer networks, intranets, and the Internet. It should be understood that any number of client devices, source devices, search engines, and networks may be employed within system 200 within the scope of the present invention.

Source devices, such as the source device 204, may maintain a variety of domains. For example, the source device 204 may be a web server that maintains multiple domains. The search engine 208 may access domain information by communicating with these source devices. For example, the search engine 208 may periodically crawl the source device 204 to access and/or update domain information, such as domain registration date, domain expiration date, domain swapping date(s), and a set of linked domains.

The search engine 208 accesses domain information from the multitude of source devices, such as the source device 204, and determines a rank for each of the domains maintained by the source devices. The ranks may be used to sort the domains when users access the search engine 208 to search for particular domains through the client device 202.

Figure 3:
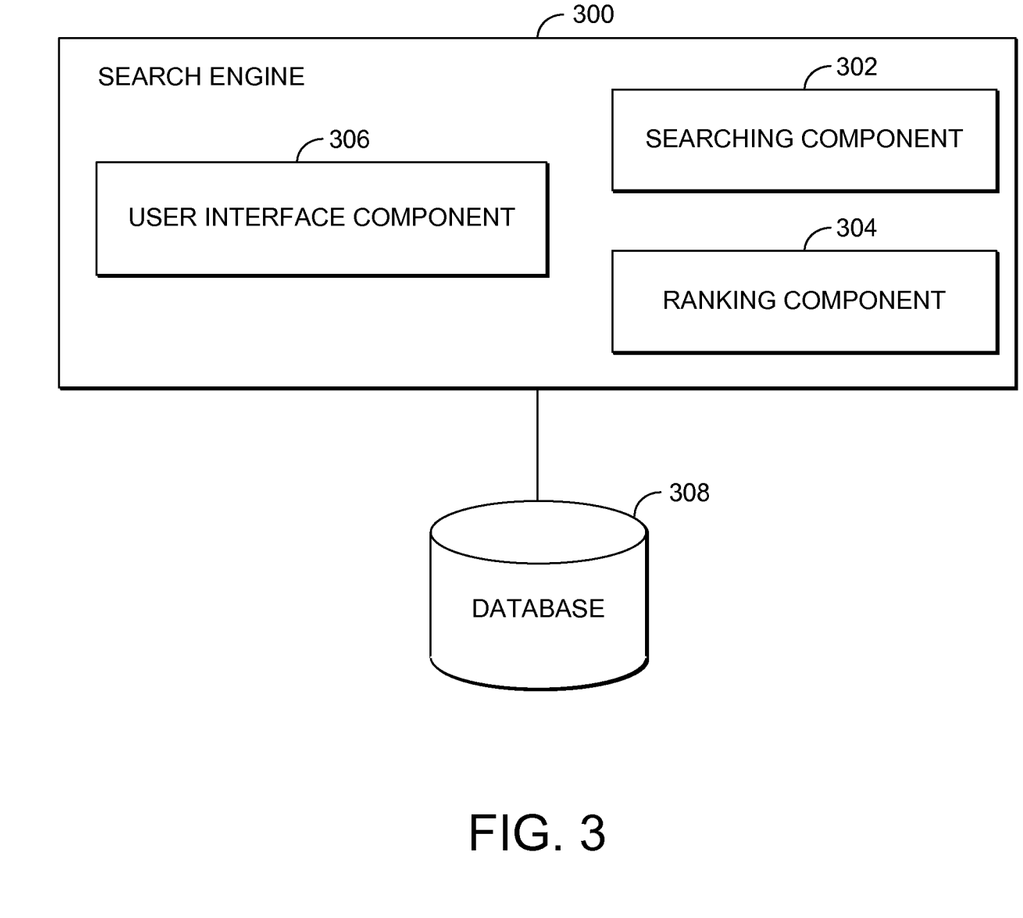
FIG. 3 is a block diagram of an exemplary search engine in accordance with an embodiment of the present invention.

Referring now to FIG. 3, an exemplary search engine 300 in accordance with an embodiment of the present invention will be described in further detail. Among other components not shown, the search engine may include a searching component 302, a ranking component 304, a database 308, and a user interface component 306. Each component may comprise a program, routine, application, or other machine-executable code capable of performing the actions discussed herein. One skilled in the art will recognize that the components shown in FIG. 3 are provided for illustrative purposes only and other arrangements may be provided in accordance with various embodiments of the present invention.

Generally, the search engine 300 may receive search queries from client devices, such as the client device 202 of FIG. 2, via the user interface component 306. The user interface component 306 may communicate to receive search queries from client devices and pass the search queries to the searching component 302 for performing searches. The user interface component 306 may also communicate to receive search results from the searching component 302 and return the search results to the client devices.

The searching component 302 may receive a search query from the user interface component 306 and perform a search to generate search results comprising domains stored in the database 308 that match the search query in accordance with the ranks of the domains. The searching component 302 may also return the search results to the user interface component 306, which may generate a search results user interface and provide the search results user interface to the requesting client device.

The ranking component 304 may collect information associated with various domains from one or more source devices, such as the source device 204 of FIG. 2, by, for example, crawling the source devices. The ranking component 304 may determine contributing domains associated with each domain, determine a maturity for each of the contributing domains, and calculate a rank for each domain based on the maturity of the contributing domains associated with a respective domain. In some embodiments, the ranking component 304 may also save domain information and domain ranks in the database 308. In some embodiments, the maturity of a contributing domain is determined based on the date that the contributing domain was registered or the date that the contributing domain was first discovered by a search engine (e.g., when domain information does not readily provide a registration date). In some embodiments, determining the maturity of a domain also includes identifying the domain as either a mature domain or an immature domain. For example, all contributing domains that were registered more than a year ago may be identified as mature domains.

In some embodiments, a domain's rank is calculated based in part on only mature contributing domains that are associated with the domain. For example, suppose a target domain called ClickHereForSearch.com is linked to by four other domains, Yahoo.com, MSN.com, CNN.com, and SearchesRus.com. Suppose further that the first three domains have been registered for more than one year while SearchesRus.com is a new domain that was registered less than two months ago. If, in the present example, a mature domain is defined as a domain that has been registered for more than a year without being expired or swapped, the domains, Yahoo.com, MSN.com, and CNN.com, would be identified as mature domains while SearchesRus.com would not. A rank for ClickHereForSearch.com may then be calculated based on linking from Yahoo.com, MSN.com, and CNN.com only (i.e., the mature domains) because SearchesRus.com is not a mature domain.

In other embodiments, a domain's rank may be calculated based, at least in part, on the presence of both mature and immature contributing domains. In such embodiments, the contribution of immature domains to a target domain's rank would be based only on the rank that the immature contributing domains received from mature domains associated with the immature contributing domains. Such embodiments recognize that although new domains often tend to be spam, not all new domains are spam and that, in fact, there are typically new domains that provide great utility. These embodiments assure that immature domains that quickly gather popularity for their utility are allowed to contribute rank that is accumulated from mature domains associated with the immature domains.

Referring back to ClickHereForSearch.com example, suppose that SearchesRus.com is a new domain that quickly gathered many other domain owners' attention for its unique search algorithms. Suppose further that popular and/or trusted domains (i.e., mature domains), such as ABC.com, Harvard.edu, and USPS.com, include at least one link to SearchesRus.com in addition to a slew of other new domains. In the present embodiment, a rank for ClickHereForSearch.com may be calculated based not only on the contribution from the mature domains, Yahoo.com, MSN.com, and CNN.com, but also on a rank of SearchesRus.com, which was calculated based only on ranks of its mature contributing domains, ABC.com, Harvard.edu, and USPS.com.

In further embodiments, instead of identifying each contributing domain as either a mature or immature domain to determine its contribution to a target domain's rank, each contributing domain's maturity (e.g., the age of each contributing domain) may be used to determine the extent of the contributing domain's contribution to the target domain's rank. In other words, a target domain's rank may be calculated based in part on a fraction of ranks of contributing domains associated with the domain. The fraction of each contributing domain's rank used to determine the target domain's rank corresponds to the maturity (e.g., age) of the contributing domain. For example, in an embodiment, domains that have been registered for more than ten years may contribute 100% of their accumulated ranks to a target domain's rank; domains that have been registered from six to ten years may contribute 75% of their accumulated ranks to a target domain's rank; domains that have been registered from three to six years may contribute 50% of their accumulated ranks to a target domain's rank; domains that have been registered for one to three years may contribute 25% of their accumulated ranks to a target domain's rank; and domains that have been registered for less than one year may only contribute 10% of their accumulated ranks.

Referring again to ClickHereForSearch.com example, suppose that Yahoo.com has been registered for more than ten years; CNN.com has been registered for seven years; MSN.com has been registered for four years; and SearchesRus.com has been registered for less than one year. The rank for ClickHereForSearch.com may be calculated based on 100% of the accumulated rank for Yahoo.com, 75% of the accumulated rank for CNN.com, 50% of the accumulated rank for MSN.com, and 10% of the accumulated rank for SearchesRus.com.

Exemplary Methods

Figure 4:
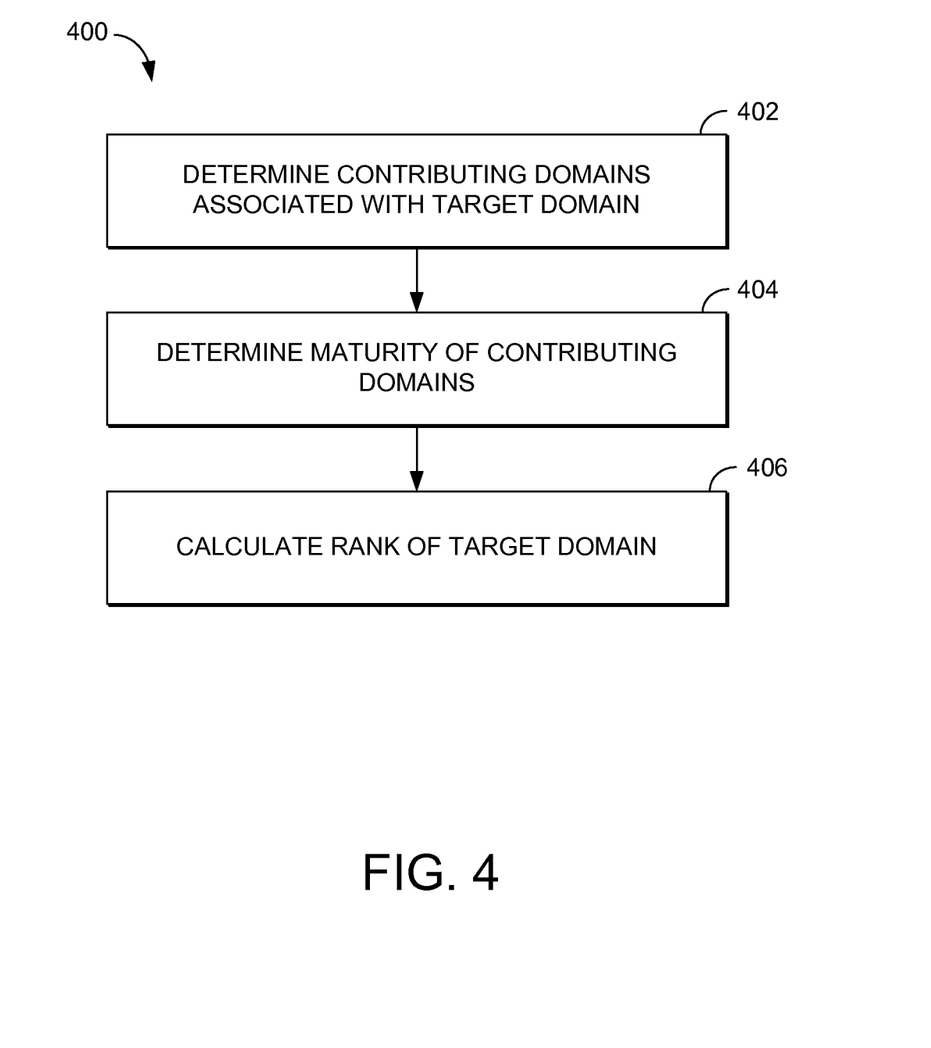
FIG. 4 is a flow diagram showing a method for ranking a domain in accordance with an embodiment of the present invention.

FIG. 4 is a flow diagram illustrating a method 400 for ranking a domain in accordance with an embodiment of the present invention. At block 402, contributing domains associated with a target domain are determined. Typically, the contributing domains are a set of domains that include one or more links to the target domain. As indicated above, in some embodiments, the search engine 208 periodically crawls the source devices, such as the source device 204, and collects new domain information and updates existing domain information. Such information may be used to identify contributing domains associated with the target domain.

At block 404, the maturity for each of the contributing domains associated with the target domain is determined. In general, a maturity of a domain is determined based on how long the domain has been known to exist. Typically, a maturity of a domain is determined based on the date that the domain was registered or the date that the domain was first discovered by a search engine (e.g., if the registration date cannot be ascertained).

As indicated above, in some embodiments, one or more of the contributing domains are identified as mature domains based on the maturity of the contributing domains. For example, all domains that were registered more than a year ago may be defined as mature domains. Similarly, in some embodiments, one or more of the contributing domains are determined to be immature domains based on the maturity of the contributing domains. For example, all domains that were registered or discovered for the first time by a search engine less than a year ago may be determined to be immature. In some embodiments, a maturity of a domain is reset if the domain expires or if the domain is swapped. Domain registration is typically based on year-to-year basis. Domain owners are required to pay an annual fee for keeping their domains. Domains will expire if the annual fees are not paid. Expired domains can, thereafter, be purchased by different owners. Spammers may purchase a block of domains that have been expired as well as new domains to form a Web Farm. Domain swapping occurs when domain users trade their domains. Spammers may take advantage of swapping by swapping their domains for domains that have not been tainted. Spammers may be further prevented from escaping preventive measures based on maturity of domains by resetting the maturity of the domains that have expired or have been swapped.

At block 406, a rank for the target domain is calculated. As indicated above, in some embodiments, only mature contributing domains are used to calculate the rank for the target domain. In other words, only contributing domains that have been identified as mature domains by meeting a predetermined minimum period of existence may contribute to the rank of the target domain. For example, suppose that a spammer purchases one hundred domains and has each of the one hundred domains include links to the remaining ninety nine domains. This extensive interlinking would typically afford each of the one hundred domains a potential to receive a high rank based on the number of domains that include a link thereto even though all one hundred of the domains may be less than a month old. However, the present embodiment prevents these contributing domains that have not been registered for more than a minimum period of time to qualify as mature domains. Accordingly, by not qualifying as mature domains in some embodiments, each of the one hundred spam domains may be successfully stopped from contributing ranks to the remaining ninety nine spam domain accumulating ranks.

In other embodiments, the target domain's rank may be determined based on both mature contributing domains and immature contributing domains. However, in such embodiment, immature contributing domains contribute to the target domain's rank only to the extent that the immature contributing domains have received rank from mature domains associated with the immature domains. For example, suppose that a mature domain is defined as a domain that has been registered for more than six months without being expired or swapped and that a target domain called ChildrensWorld.com is linked to by two other domains, ToysRus.com and NewToyCompany.com. NewToyCompany.com is a new domain that was registered less than a month ago, but is linked to by two mature domains, Kmart.com and Target.com, in addition to other newer domains. A rank for the target domain may be calculated based on a rank of NewToyCompany.com, which was calculated based only on ranks of the two mature contributing domains, Kmart.com and Target.com, in addition to the rank of ToysRus.com, which is a mature domain.

In further embodiments, the target domain's rank is determined not by identifying mature and immature contributing domains, but by determining the extent of a contributing domain's contribution based on its maturity. Such embodiments provide a sliding scale approach based on contributing domain maturity. In such embodiments, a fraction may be determined for each contributing domain based on its maturity and applied to determine that respective contributing domain's contribution to the target domain's rank. For example, contributing domains that have been registered for a longer period of time (i.e., have a greater maturity) may contribute more to a target domain's rank than contributing domains that have been registered for a shorter period of time (i.e., have a lesser maturity).

Figure 5:
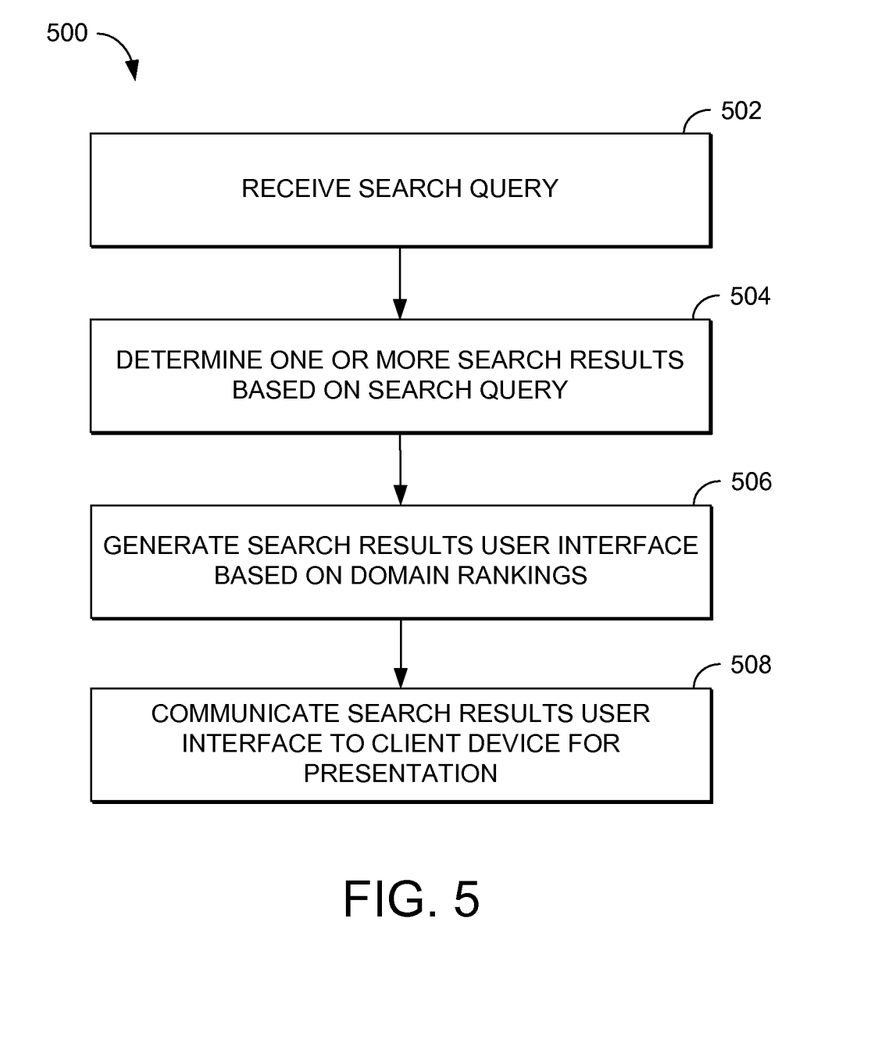
FIG. 5. is a flow diagram showing a method for presenting search results in accordance with an embodiment of the present invention.

FIG. 5 is a flow diagram illustrating a method 500 for presenting search results in accordance with an embodiment of the present invention. At block 502, a search query is received at a search engine, such as the search engine 208 of FIG. 2, from a client device, such as the client device 202 of FIG. 2. At block 504, one or more search results are determined for the search query using domains that have been previously received or collected and stored in a database, such as the database 308 of FIG. 3. For example, the search engine may search the database and select one or more domains stored therein that match the search query.

At block 506, a search results user interface is generated using domain rankings to determine an order for the search results. For example, the search results may be presented with the higher ranked domains at the top such that users would see more reliable and/or popular domains first. Typically, ranks for the domains have already been determined and stored in the database prior to being used for ordering the search results. The domain rankings may have been generated in a manner similar to the embodiments described hereinabove with reference to FIG. 4. The search result user interface is then communicated from the search engine to the client device for presentation on the client device, as shown at block 508. Advantageously, the present invention's approaches to ranking domains may be used to assist search engines to rank domains in accordance with the popularity and utility of the domains while preventing spam domains from earning undeservedly high ranks.

CONCLUSION

Embodiments of the present invention relate to, among other things, ranking a domain. One or more contributing domains associated with a target domain are identified and the maturity of the contributing domains is determined. By way of example only and not limitation, the maturity of a contributing domain may be determined based on the date that it was registered or the date that it was first discovered by a search engine. In turn, the maturity of the contributing domains may be used to calculate a rank for the target domain.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more hardware devices having computer-usable instructions embodied thereon that, when executed by one or more computing devices, perform a method for presenting ranked search results to a user such that a spam domain is prevented from being presented with an undeservedly high rank within the presented ranked search results, the method comprising:
receiving a list of one or more contributing domains associated with a domain;
determining a maturity for at least one of the one or more contributing domains, wherein determining the maturity for at least one of the one or more contributing domains comprises identifying at least one of the one or more contributing domains as an immature domain;
calculating a rank for the domain based at least in part on the maturity for the at least one of the one or more contributing domains, wherein calculating the rank for the domain comprises calculating the rank based at least in part on a rank of the immature domain, wherein the rank of the immature domain is based on contributing domains associated with the immature domain that have been identified as mature domains; and
generating a search results user interface comprising search results including the domain, wherein the domain is ordered in the search results according to the calculated rank for the domain.

2. The one or more hardware devices of claim 1, wherein determining the maturity for at least one of the one or more contributing domains comprises identifying at least one of the one or more contributing domains as a mature domain.

3. The one or more hardware devices of claim 2, wherein the mature domain is identified based on factors comprising at least one of a date of domain registration and a date of first discovery of the mature domain.

4. The one or more hardware devices of claim 3, wherein the mature domain is a contributing domain that has been registered for more than one year without having expired or being swapped.

5. The one or more hardware devices of claim 2, wherein calculating the rank for the domain comprises calculating the rank based at least in part on a rank of the mature domain.

6. The one or more hardware devices of claim 1, wherein calculating the rank for the domain comprises calculating the rank based on a fraction of a number associated with at least one of the one or more contributing domains, wherein the fraction of the number associated with the at least one of the one or more contributing domains corresponds to the maturity of the at least one of the one or more contributing domains.

7. The one or more hardware devices of claim 1, wherein each of the one or more contributing domains comprise a domain that includes at least one link to the domain.

8. The one or more hardware devices of claim 1, further comprising using the rank of the domain to facilitate ordering results for a search query that include the domain.

9. A method for presenting ranked search results to a user such that a spam domain is prevented from being presented with an undeservedly high rank within the presented ranked search results, comprising:
receiving information associated with a plurality of domains;
determining a maturity for each of one or more contributing domains associated with each of the plurality of domains, wherein determining the maturity for each of the one or more contributing domains comprises identifying at least one of the one or more contributing domains as an immature domain;
calculating a rank for each of the plurality of domains based at least in part on the maturity for at least one of the one or more contributing domains associated with the each of the plurality of domains, wherein calculating the rank for a domain comprises calculating the rank based at least in part on a rank of the immature domain, wherein the rank of the immature domain is based on contributing domains associated with the immature domain that have been identified as mature domains;
in response to receiving a search query, generating one or more search results comprising at least one of the plurality of domains that match the search query; and
presenting the one or more search results in accordance with ranks of the at least one of the plurality of domains that match the search query.

10. The method of claim 9, wherein determining the maturity for each of the one or more contributing domains associated with each of the plurality of domains comprises identifying at least one of the one or more contributing domains as a mature domain.

11. The method of claim 10, wherein calculating the rank for each of the plurality of domains comprises calculating the rank based at least in part on a rank of the mature domain.

12. The method of claim 9, wherein calculating the rank for each of the plurality of domains comprises calculating the rank based on a fraction of a rank associated with at least one of the one or more contributing domains, wherein the fraction of the rank associated with the at least one of the one or more contributing domains corresponds to the maturity of the at least one of the one or more contributing domains.

13. One or more hardware devices storing computer-executable instructions which, when executed by one or more processors, embody a search engine for presenting ranked search results to a user such that a spam domain is prevented from being presented with an undeservedly high rank within the presented ranked search results, the search engine comprising:
   a ranking component configured to:
      A) determine one or more contributing domains associated with each of a plurality of domains, each of the contributing domains including one or more links, wherein each link is directed to one of the plurality of domains,
      B) determine a maturity for each of the one or more contributing domains, the maturity based on factors including at least one selected from the following, a date of domain registration and/or a date of first discovery, wherein determine the maturity for each of the one or more contributing domains comprises identify at least one of the one or more contributing domains as an immature domain, and
      C) calculate a rank for each of the plurality of domains based at least in part on the maturity for at least one of the one or more contributing domains, wherein calculate the rank for a domain comprises calculate the rank based at least in part on a rank of the immature domain, wherein the rank of the immature domain is based on contributing domains associated with the immature domain that have been identified as mature domains;
   a searching component configured to perform a search in response to a search query and to return one or more search results comprising at least one of the plurality of domains that match the search query, wherein the one or more search results are ordered at least in part based on the rank associated with the at least one of the plurality of domains that match the search query; and
   a user interface component configured to generate a search results user interface that presents the search results ordered at least in part based on the rank associated with the at least one of the plurality of domains that match the search query.

14. The one or more hardware devices of claim 13, further comprising a user interface component configured to receive the search query and to present the one or more search results in accordance with the ranks of the at least one of the plurality of domains that match the search query.

15. The one or more hardware devices of claim 13, wherein the ranking component is further configured to determine the maturity for each of the one or more contributing domains by identifying at least one of the one or more contributing domains as a mature domain.

16. The one or more hardware devices of claim 15, wherein the ranking component is further configured to calculate the rank for each of the plurality of domains based at least in part on a rank of the mature domain.

17. The one or more hardware devices of claim 13, wherein the ranking component is further configured to calculate the rank for each of the plurality of domains based on a fraction of a rank associated with at least one of the one or more contributing domains, wherein the fraction of the rank associated with the at least one of the one or more contributing domains corresponds to the maturity of the at least one of the one or more contributing domains.

18. A system for presenting ranked search results to a user such that a spam domain is prevented from being presented with an undeservedly high rank within the presented ranked search results, comprising:
   a ranking component comprising one or more computing devices configured to:
      A) determine one or more contributing domains associated with each of a plurality of domains, wherein for each domain of the plurality of domains, each of the one or more contributing domains is another domain that includes at least one link to the domain,
      B) determine a maturity for each of the one or more contributing domains, the maturity based on factors including at least one of a date of domain registration or a date of first discovery, wherein determine the maturity for each of the one or more contributing domains comprises identify at least one of the one or more contributing domains as an immature domain, and
      C) calculate a rank for each of the plurality of domains based at least in part on the maturity for at least one of the one or more contributing domains, wherein calculate the rank for a domain comprises calculate the rank based at least in part on a rank of the immature domain, wherein the rank of the immature domain is based on contributing domains associated with the immature domain that have been identified as mature domains;
   a searching component comprising one or more computing devices configured to:
      A) perform a search in response to a search query, and
      B) return one or more search results comprising at least some of the plurality of domains that match the search query, wherein the one or more search results are ordered at least in part based on the rank associated with the at least some of the plurality of domains that match the search query; and
   a user interface component comprising one or more computing devices configured to generate a search results user interface that presents the search results ordered at least in part based on the rank associated with the at least one of the plurality of domains that match the search query.

19. The system of claim 18, wherein the ranking component is further configured to determine the maturity for each of the one or more contributing domains by identifying at least one of the one or more contributing domains as a mature domain.

20. The system of claim 19, wherein the ranking component is further configured to calculate the rank for each of the plurality of domains based at least in part on a rank of one or more identified mature domains.

* * * * *